United States Patent
Allard et al.

(10) Patent No.: US 8,342,015 B2
(45) Date of Patent: Jan. 1, 2013

(54) METHOD FOR DIAGNOSING THE EXCHANGER BYPASS FLAP IN AN EXHAUST GAS RECIRCULATION CIRCUIT

(75) Inventors: Julien Allard, Savigny sur Orge (FR); Clement Petit, Paris (FR); Ronan Le-Bras, Paris (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 13/079,349

(22) Filed: Apr. 4, 2011

(65) Prior Publication Data

US 2011/0247407 A1 Oct. 13, 2011

Related U.S. Application Data

(63) Continuation of application No. 12/679,190, filed as application No. PCT/FR2008/051406 on Jul. 25, 2008, now abandoned.

(30) Foreign Application Priority Data

Sep. 20, 2007 (FR) .................................. 07 57707

(51) Int. Cl.
*G01M 15/10* (2006.01)
(52) U.S. Cl. .................................................. 73/114.74
(58) Field of Classification Search ............... 73/114.69, 73/114.74

See application file for complete search history.

(56) References Cited

U.S. PATENT DOCUMENTS

| | | | | |
|---|---|---|---|---|
| 5,732,688 | A * | 3/1998 | Charlton et al. | 123/568.12 |
| 6,085,732 | A * | 7/2000 | Wang et al. | 123/568.12 |
| 6,508,111 | B2 * | 1/2003 | Osaki et al. | 73/114.74 |
| 6,655,200 | B2 * | 12/2003 | Osaki et al. | 73/114.74 |
| 6,725,847 | B2 * | 4/2004 | Brunemann et al. | 123/568.12 |
| 6,755,078 | B2 * | 6/2004 | Hernandez et al. | 73/114.74 |
| 6,779,390 | B2 * | 8/2004 | Osaki et al. | 73/114.74 |
| 6,848,434 | B2 * | 2/2005 | Li et al. | 123/568.12 |
| 8,037,737 | B2 * | 10/2011 | Recouvreur et al. | 73/23.31 |
| 2003/0106367 | A1 * | 6/2003 | Osaki et al. | 73/118.2 |
| 2003/0213230 | A1 * | 11/2003 | Yahata et al. | 60/278 |
| 2003/0226398 | A1 * | 12/2003 | Hernandez et al. | 73/118.1 |
| 2004/0084030 | A1 * | 5/2004 | Matsunaga et al. | 123/568.12 |
| 2006/0042608 | A1 * | 3/2006 | Buck et al. | 123/568.12 |
| 2010/0307231 | A1 | 12/2010 | Allard et al. | |

FOREIGN PATENT DOCUMENTS

| | | |
|---|---|---|
| JP | 63 117154 | 5/1988 |
| JP | 2004 346918 | 12/2004 |
| JP | 2006 291921 | 10/2006 |
| JP | 2006 299895 | 11/2006 |

* cited by examiner

*Primary Examiner* — Freddie Kirkland, III
(74) *Attorney, Agent, or Firm* — Oblon, Spivak, McClelland, Maier & Neustadt, L.L.P.

(57) ABSTRACT

A method for diagnosing a failure of an EGR circuit of an engine including an EGR exchanger, an EGR valve, a bypass duct of the EGR exchanger, and a bypass flap arranged upstream from the EGR exchanger and the bypass duct to adjust a proportion of exhaust gases flowing therethrough. The EGR circuit can be activated according to a cooled mode, in which the flap is shut, or according to a bypass mode, in which the flat is open. The method carries out, during a diagnosis phase, two activations of the flap, and measures an average of variations of the EGR gas temperature at an outlet of the EGR exchanger during the diagnosis phase.

8 Claims, 4 Drawing Sheets

METHOD FOR DIAGNOSING THE EXCHANGER BYPASS FLAP IN AN EXHAUST GAS RECIRCULATION CIRCUIT

CROSS-REFERENCE TO RELATED APPLICATIONS

The present application is a continuation of U.S. application Ser. No. 12/679,190, filed on Mar. 19, 2010, which is a National Stage of PCT/FR08/051406, filed on Jul. 25, 2008, and is based upon and claims the benefit of priority from the French Patent Application No. 07 57707, filed on Sep. 20, 2007, the entire contents of each of which are incorporated herein by reference.

FIELD OF THE INVENTION

The present invention relates to a method of diagnosing a failure of the EGR circuit of an engine, more specifically the blocking of the bypass flap of the EGR exchanger.

BACKGROUND OF THE INVENTION

The bypass flap is a key element in the exhaust gas recirculation (EGR) system.

Its function is to direct the EGR gases into a bypass circuit of the exchanger in order to exploit hot gases in priming the catalyst.

The correct operation of the flap therefore makes it possible to guarantee the depollution of current diesel engines. Blocking of the flap in bypass mode or in cooled mode has direct consequences on the pollution emitted from the engine outlet.

Since pollution thresholds are becoming increasingly strict, it is vitally important, in order to satisfy the next standards, to diagnose such failures of the flap.

The risk associated with the blocking of the flap is also not linked solely to pollution. In practice, a failure of the flap can have consequences on the reliability of the surrounding components (degradation due to an excessively high temperature of the EGR valve and its mounting) and the integrity of the engine control strategies that use it (such as, for example, clearing the valve and the exchanger, or even priming the catalyst).

A number of failure diagnosis methods have already been developed, with variable performance levels.

A first method, disclosed in the document JP2006-291921, uses a temperature sensor situated at the inlet of the intake distributor and makes it possible to diagnose a blocking of the flap by measuring the temperature difference between the cooled mode and the bypass mode. However, this method based on a simple difference between two temperatures, offers little robustness with respect to the dispersions and variations associated with the inertia of the EGR circuit. Furthermore, this method has the drawback of not making it possible to check the correct closure of the flap after actuation: a blocking of the flap in the actuated position will therefore be detected only on the next occurrence of the diagnosis. Moreover, this method appears relatively imprecise because the temperature sensor situated at the inlet of the intake distributor is subject to the influence of the cool air intake.

Another method, described in the document JP 2003-247459, implements a strategy based on monitoring the air flow rate before and after activation of the bypass flap, the air intake flap and the EGR valve being totally open. The main advantage of this solution is that it simply uses the flow meter situated on the cool air intake duct. However, depending on the technical means employed, this strategy may result in a not-inconsiderable false detection ratio, due to the EGR environment (high temperatures, fouling of the connections) and to the limited reactivity of the flap control. In practice, pressure wave phenomena delay the control through the vacuum of the bypass flap.

Finally, other applications use a contactor that makes it possible to know the open/closed position of the flap. However, this strategy can also lead to a high false detection ratio, because of the EGR environment.

One aim of the invention is therefore to define a simple and reliable method that makes it possible to detect any failure of the bypass flap. Another aim of the invention is to diagnose a total loss of the cooling function.

BRIEF DESCRIPTION OF THE INVENTION

A first subject of the invention is a method for diagnosing a failure of the EGR circuit of an engine comprising an EGR exchanger, an EGR valve, a bypass duct of the EGR exchanger, and a so-called bypass flap, arranged upstream of the EGR exchanger and of the bypass duct in order to control the proportion of exhaust gases passing through the latter, wherein the EGR circuit can be activated according to a so-called cooled mode, in which the flap is closed, and a so-called bypass mode, in which the flap is open, the method being characterized in that, during a diagnosis phase, two activations of the flap are carried out, and in that an average of the variations of the temperature of the EGR gases is measured at the outlet of the EGR exchanger during the diagnosis phase.

According to other characteristics of the invention:
the aim of the first activation is to open the flap, and the aim of the second activation is to close the flap;
the maximum temperature reached during the diagnosis phase is measured;
a first temperature difference is calculated between said maximum temperature and the temperature measured at the moment of the first activation and a second temperature difference is calculated between said maximum temperature and the temperature measured at the end of the diagnosis phase;
the average of the first and second temperature differences is calculated;
the average is compared to a predetermined threshold so that:
if the average is greater than the threshold, then the flap is functional;
if the average is less than the threshold, then the flap has failed.

Another subject of the invention relates to a device for diagnosing a failure of the EGR circuit of an engine comprising an EGR exchanger, an EGR valve, a bypass duct of the EGR exchanger, and a so-called bypass flap, arranged upstream of the EGR exchanger and of the bypass duct in order to control the proportion of exhaust gases passing through the latter, wherein the EGR circuit can be activated according to a so-called cooled mode, in which the flap is closed, and a so-called bypass mode, in which the flap is open, the device comprising:
a temperature sensor (34) arranged in such a way as to measure the temperature of the EGR gases leaving the exchanger,
a means of acquiring the temperature measurements,
a means of calculating the averages of the measured temperatures,
a means of comparison with a predetermined threshold (S).

A third subject of the invention relates to a motor vehicle comprising temperature measurement means and calculation means making it possible to implement the diagnosis method according to the invention.

BRIEF DESCRIPTION OF THE DRAWINGS

Other aims, features and benefits of the invention will become more apparent from reading the following detailed description of the invention, with reference to the appended drawings in which.

DETAILED DESCRIPTION OF THE INVENTION

Figure 1:
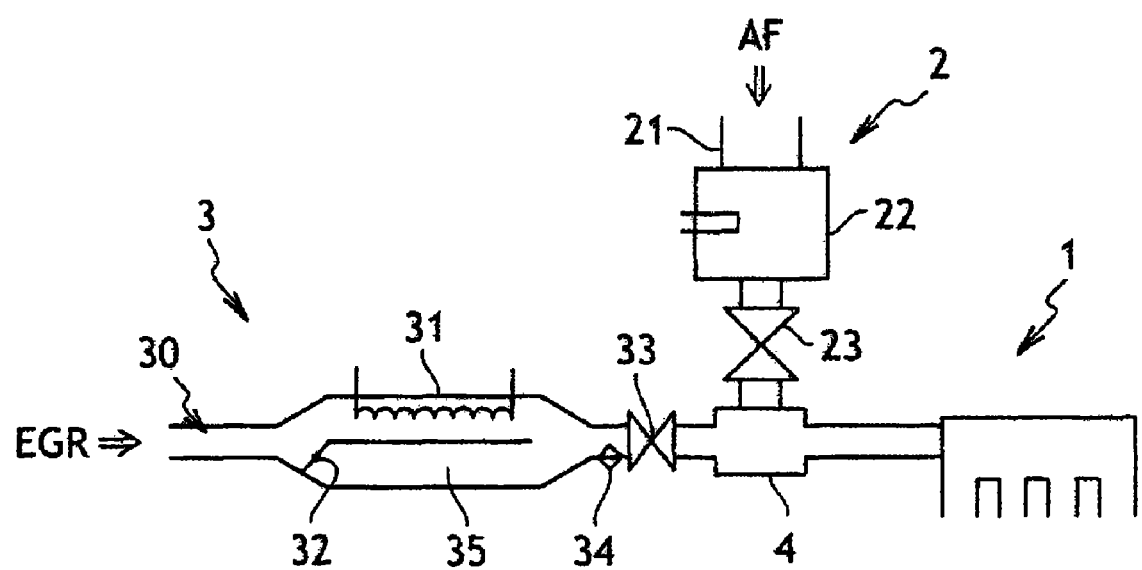
FIG. 1 diagrammatically represents an EGR gas recirculation device to which the invention is applied.

Referring to FIG. 1, the engine 1 comprises a cool air intake circuit 2 comprising an air inlet duct 21 and an air flow meter 22. The cool air intake into the intake distributor 4 is adjusted by means of an air flap 23.

The engine also comprises an EGR gas recirculation circuit 3 comprising a duct 30 for recirculating the EGR gases taken from the exhaust, an EGR exchanger 31 and a valve 33, called EGR valve, that makes it possible to control the flow rate of EGR gases entering into the intake distributor 4. A bypass duct 35 is arranged parallel to the exchanger 31; a bypass flap 32 is arranged upstream of the latter so that:

when the flap 32 is closed, the EGR gases pass through the exchanger and are cooled therein (the so-called "cooled mode"), and when the flap 32 is open, the EGR gases flow through the bypass duct and substantially retain their high temperature (the so-called "bypass" mode).

In FIG. 1, the bypass duct 35 is diagrammatically represented as being incorporated in the exchanger 31, but this representation is not limiting and bypass ducts dissociated from the EGR exchanger can be found.

A temperature sensor 34 is, furthermore, arranged between the outlet of the exchanger 31 and the EGR valve 33, in order to measure the temperature (denoted TsEGR) of the EGR gases leaving the exchanger. According to a variant embodiment, the sensor 34 can also be arranged downstream of the EGR valve 33.

The diagnosis strategy is based on monitoring the EGR temperature before and after the activation of the exchanger bypass. In practice:

a high variation in TsEGR between the activation (opening) and closure of the flap indicates that the flap 32 is functional;

conversely, a low variation in TsEGR indicates that the flap 32 is blocked.

The diagnosis principle according to the invention will be described with reference to FIG. 2.

Firstly, it is important to specify the area and the conditions necessary in implementing the diagnosis. Detecting a failure of the EGR bypass flap is in effect possible only when the operating conditions are stabilized, in order to filter the temperature fluctuations and inertias. The operating point of the strategy will be to make a determination as a function of the temperature differences observed on the levels of the European type approval cycle (NEDC): those with the greatest temperature difference will be chosen.

The diagnosis strategy is based on monitoring the variation in the temperature TsEGR at the outlet of the EGR exchanger 31, after actuation of the bypass flap 32.

Figure 2:
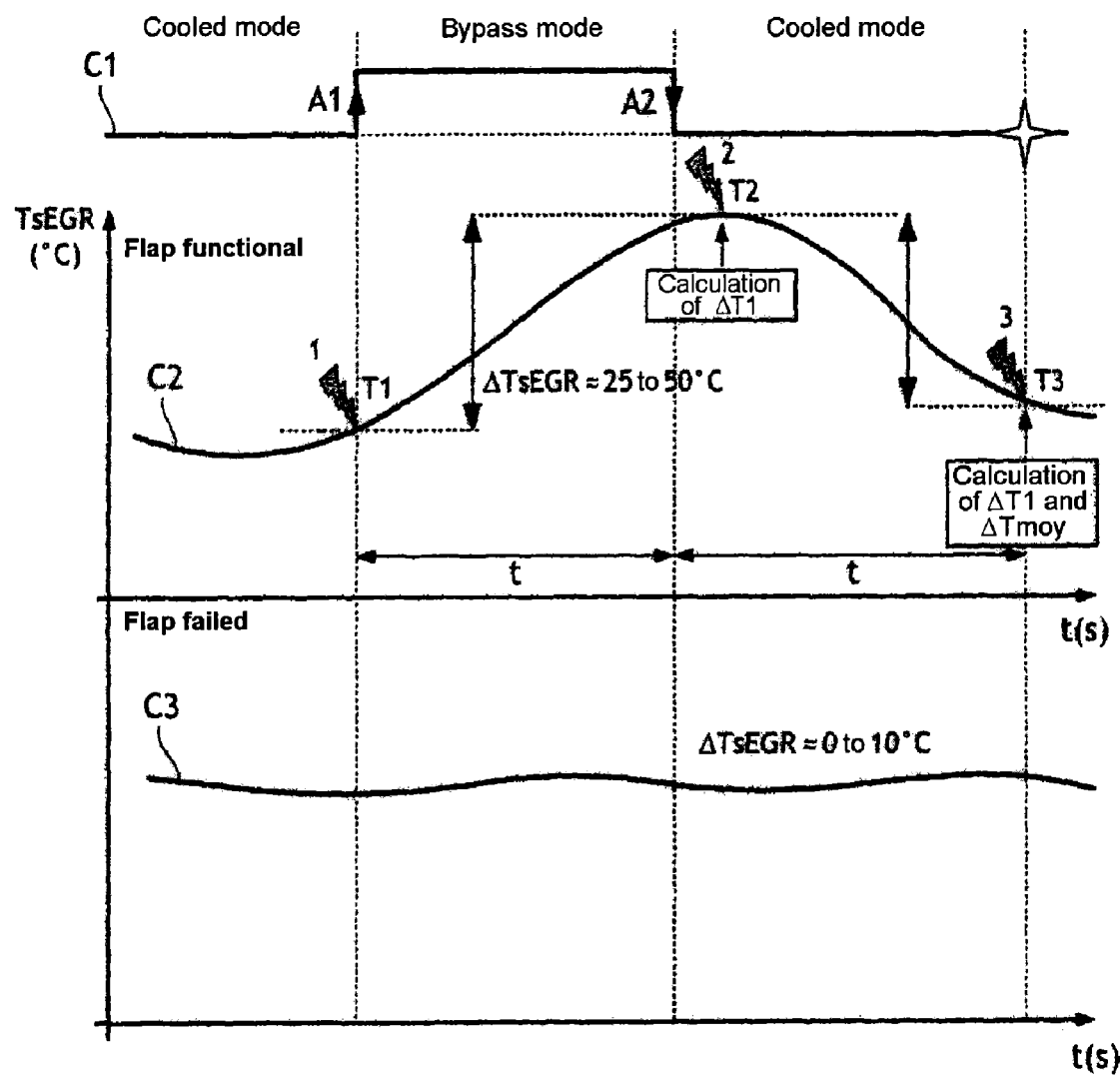
FIG. 2 is a graph illustrating the operating principle of the invention.

In FIG. 2, the curve C1, in the form of a pulse, represents the trend of the control of the bypass flap 32 during a diagnosis phase. The low value corresponds to the cooled mode (that is to say that the flap 32 is closed so that all the EGR gases pass through the exchanger 31); the high value corresponds to the bypass mode (in which the flap 32 is open so that the EGR gases flow through the bypass duct 35).

The curve C2 represents the theoretical trend of the temperature TsEGR during a diagnosis phase, with the same time scale as that of the curve C1, with a functional flap 32.

The curve C3 represents the theoretical trend of the temperature TsEGR during a diagnosis phase, with the same time scale as that of the curve C1, with a failed flap 32.

When the diagnosis conditions are reached, the bypass flap 32 is actuated, so that the system switches from the cooled mode to the bypass mode (represented by the arrow A1 on the curve C1). At that instant, a first acquisition (denoted T1) of the temperature TsEGR, is carried out.

The flap is therefore driven into the open position for a first duration t, which should correspond to the average duration that makes it possible to ensure that the flap is fully open. This time is determined on a per-case basis and controlled in terms of ageing.

The flap is then actuated (arrow A2 on the curve C1) so as to switch from the bypass mode to the cooled mode; it is kept closed for a second duration t. At the end of this time period, an acquisition (denoted T3) of the temperature TsEGR is carried out. The duration of the diagnosis phase is therefore 2t.

Throughout the entire diagnosis phase, the maximum temperature (denoted T2) reached at the outlet of the EGR exchanger is sought. This makes it possible to disregard the thermal inertia of the EGR circuit.

It is then possible to calculate a first temperature difference: $\Delta T1=T2-T1$. This calculation is carried out between the point 1 (flap opening moment) and the point 2 (maximum TsEGR reached during the diagnosis phase) of the curve C2.

A second temperature difference is also calculated: $\Delta T1=T2-T3$. This calculation is carried out between the point 2 and the point 3 (corresponding to the end of the diagnosis phase and complete closure of the flap) of the curve C2.

The diagnosis criterion is the average of these two differences, which makes it possible to disregard the external disturbances encountered in the routine use of a vehicle (road condition, dispersions, etc.). This diagnosis criterion is designated by $\Delta Tmoy=(\Delta T1+\Delta T2)/2$.

$\Delta T1$ is calculated on the first activation. However, this calculation alone does not make it possible to detect an untimely blocking of the flap while the diagnosis is running. It is therefore important to check whether the flap has indeed reverted to its original position. The second difference $\Delta T2$ calculated on the second activation makes it possible to detect it.

Furthermore, the calculation of the second difference increases the detection reliability.

With a functional flap (curve C2), activating the flap has a visible impact on the temperature TsEGR, which is reflected in relatively high differences $\Delta T1$ and $\Delta T2$, typically of the order of 25° C. for low-efficiency exchangers, possibly ranging up to 100° C. for exchangers that offer high efficiency.

However, with a failed flap (curve C3), the activation of the flap has no impact on the temperature TsEGR, which is reflected in very low temperature differences, of the order of 0 to 10° C.

Using statistical studies, a threshold S is determined such that:

if $\Delta Tmoy=(\Delta T1+\Delta T2)/2$ is greater than S, then the bypass flap is functional;

if $\Delta Tmoy=(\Delta T1+\Delta T2)/2$ is less than S, it is considered that the flap has failed, the possible failure causes being mechanical seizing, disconnection of the hose from the bypass solenoid valve, or even a control problem.

Figure 3:
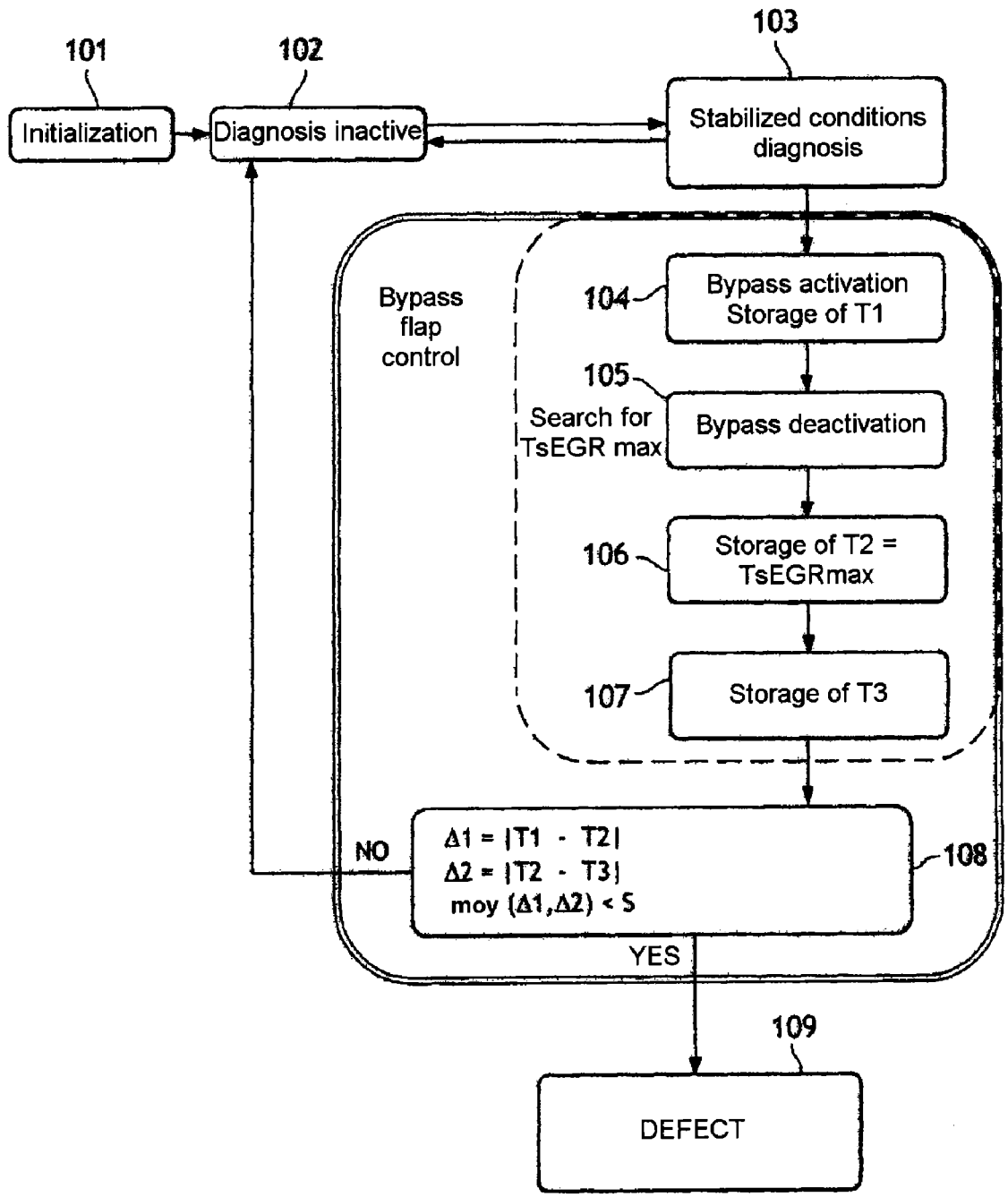
FIG. 3 is a flow diagram of the implementation of the diagnosis.

Referring to FIG. 3, the logical process used to carry out the diagnosis therefore comprises the following steps:

when the vehicle is started up, the device is initialized (box 101);

until the conditions have stabilized (box 102), the diagnosis is inactive;

when the conditions have stabilized (box 103), the bypass control is activated and the temperature TsEGR_1 is stored (box 104);

the bypass control is then deactivated (box 105);

the temperature TsEGR_2 is stored (box 106);

the temperature TsEGR_3 is stored (box 107);

the following temperature differences are calculated:

$$\Delta T1=|TsEGR\_1 - TsEGR\_2|$$

$$\Delta T2=|TsEGR\_2 - TsEGR\_3|$$

then the average of the differences ($\Delta Tmoy=(\Delta T1+\Delta T2)/2$) is compared with the predetermined threshold S (box 108);

if $\Delta Tmoy<S$, a fault is signaled (box 109);

if $\Delta Tmoy>S$, the diagnosis is deactivated (box 102).

When the fault is confirmed, an information item (called DTC or Diagnostic Trouble Code) is stored in the memory of the computer; a service lamp lights; finally, a degraded mode is activated, which involves closing the EGR valve in order to reduce the temperature at its terminals.

Figure 4:
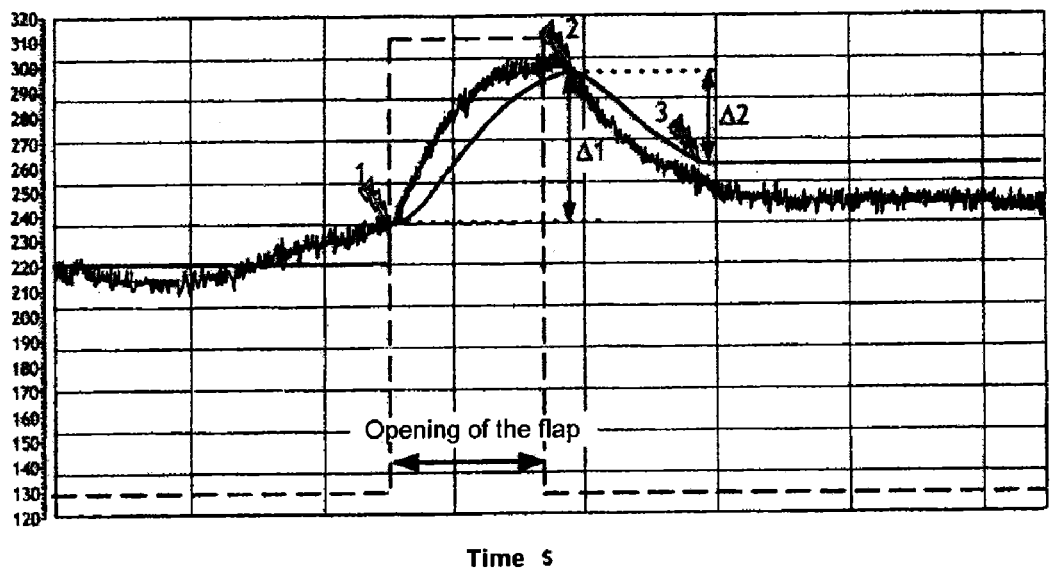
FIG. 4 is a curve of the results of tests carried out with a functional bypass flap.

FIG. 4 shows the results of the measurement of TsEGR with a functional flap.

Figure 5:
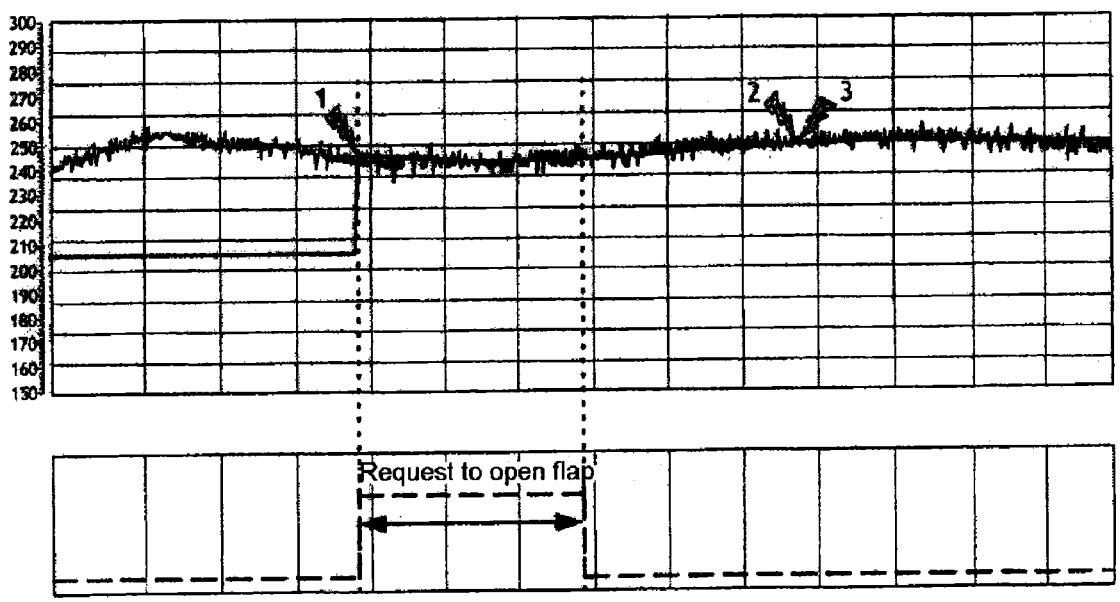
FIG. 5 is a curve of results of tests carried out with a blocked bypass flap.

FIG. 5 shows the results of the measurement of TsEGR with the bypass control disconnected.

The diagnosis method that has just been outlined therefore offers the benefit of being based on a very reliable strategy. In practice, tests carried out on an application with an EGR exchanger with very low efficiency have shown the discriminating nature of the criterion $\Delta Tmoy$.

Furthermore, the proposed method makes it possible to check the correct closure of the valve even during the diagnosis phase.

Finally, measuring the temperature TsEGR entails using a temperature sensor, but this measurement does not make it possible to carry out only diagnosis of the bypass flap but can be used for other diagnoses—diagnosing the EGR exchanger for example, and notably the total loss of the cooling function; failures leading to this loss—water leak for example—nevertheless being more rare.

The invention claimed is:

1. A method of diagnosing a failure of an EGR circuit of an engine including
   an EGR exchanger,
   an EGR valve,
   a bypass duct of the EGR exchanger, and
   a bypass flap, arranged upstream of the EGR exchanger and upstream of the bypass duct to control a proportion of exhaust gases passing through the bypass duct, wherein the EGR circuit can be activated according to a cooled mode, in which the flap is closed, and a bypass mode, in which the flap is open, the method comprising:
   carrying out, during a diagnosis phase, first and second activations of the flap; and
   measuring an average of variations of a temperature of the EGR gases at an outlet of the EGR exchanger during the diagnosis phase.

2. The method as claimed in claim 1, wherein the first activation opens the flap, and the second activation closes the flap.

3. The method as claimed in claim 2, wherein a maximum temperature reached during the diagnosis phase is measured.

4. The method as claimed in claim 3, wherein
   a first temperature difference is calculated between the maximum temperature and a temperature measured at a moment of the first activation, and
   a second temperature difference is calculated between the maximum temperature and a temperature measured at an end of the diagnosis phase.

5. The method as claimed in claim 4, wherein an average of the first and second temperature differences is calculated.

6. The method as claimed in claim 5, wherein the average of the first and second temperature differences is compared to a predetermined threshold so that:
   if the average of the first and second temperature differences is greater than the predetermined threshold, then the flap is functional; or
   if the average of the first and second temperature differences is less than the predetermined threshold, then the flap has failed.

7. A motor vehicle, comprising temperature measurement means and calculation means configured to implement the method as claimed in claim 1.

8. A device for diagnosing a failure of an EGR circuit of an engine including
   an EGR exchanger,
   an EGR valve,
   a bypass duct of the EGR exchanger, and
   a bypass flap, arranged upstream of the EGR exchanger and of the bypass duct to control a proportion of exhaust gases passing through the bypass duct, wherein the EGR circuit can be activated according to a cooled mode, in which the flap is closed, and a bypass mode, in which the flap is open, the device comprising:
   a temperature sensor arranged so as to measure a temperature of EGR gases leaving the EGR exchanger;
   means for acquiring temperature measurements from the temperature sensor;
   means for calculating averages of the temperature measurements; and
   means for comparing the averages of the temperature measurements with a predetermined threshold.

* * * * *